Figure 1:
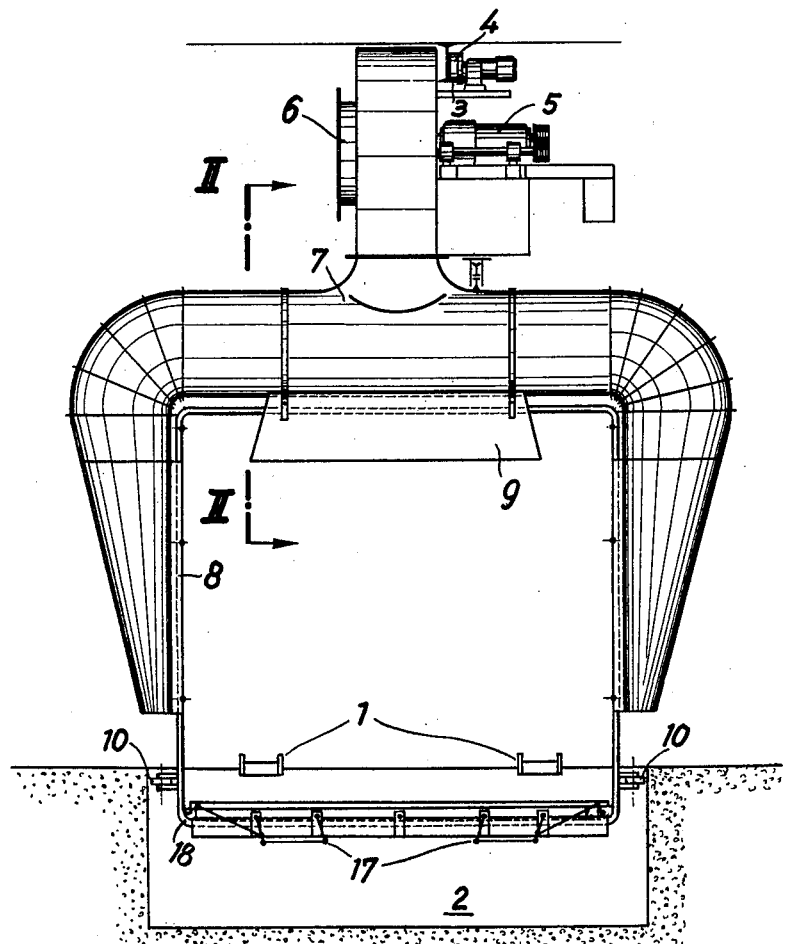

Jan. 15, 1963  F. LUKAS  3,073,321
MOTOR VEHICLE WASHING APPARATUS
Filed Feb. 13, 1961  2 Sheets-Sheet 1

INVENTOR
FRITZ LUKAS

By Toulmin & Toulmin
Attorneys

Jan. 15, 1963 F. LUKAS 3,073,321
MOTOR VEHICLE WASHING APPARATUS
Filed Feb. 13, 1961 2 Sheets-Sheet 2

INVENTOR
FRITZ LUKAS

By Toulmin & Toulmin
Attorneys

United States Patent Office 3,073,321
Patented Jan. 15, 1963

3,073,321
MOTOR VEHICLE WASHING APPARATUS
Fritz Lukas, Schiesstattweg 11, Passau-Aerbach, Bavaria, Germany
Filed Feb. 13, 1961, Ser. No. 88,957
Claims priority, application Germany Feb. 19, 1960
2 Claims. (Cl. 134—57)

Plants for washing motor vehicles are known having an inverted U-shaped frame which surrounds the vehicle to be washed at the top and at the sides, can travel by means of rollers on rails extending in the longitudinal direction of the vehicle and provided with end stops and which is driven in such a manner that these end stops, which are constructed as switches, effect the switching on and off of the driving motor. In these known washing plants a water spraying installation and an air passage connected to a blower are united in a structural unit.

It is mostly required that the vehicle be also cleaned on the underside. In the known plants, however, such a spraying installation is not provided for washing the underside of the vehicle, with the result that the cleaning of the underside must be carried out separately which mostly necessitates running the vehicle to another place. This is inconvenient and considerably adds to time required for washing the vehicle.

In a known travelling spraying installation a horizontal swivel arm is connected up to the water supply and has at its end a rotary spraying wheel delivering water under pressure. With this arrangement the washing of the underside of the vehicle can only be carried out in an incomplete manner and the arm carrying the spraying wheel cannot swing in under the vehicles to clean the part where the axles with the wheels of the vehicle are located. As a result the parts under the axles, the wheels and the wings or mudguards are not reached at all or only imperfectly reached with this primitive spraying installation.

Contrary to the known washing plants in which the vehicle is run on to a closed concrete surface in the washing cabin, the washing plant according to the invention is provided with run-on rails for the vehicle and underneath these rails the inverted U-shaped frame has an extension provided with upwardly directed nozzles which are preferably laterally displaceable.

Therefore according to the invention, a conduit extending under the run-on rails and provided with upwardly directed preferably laterally displaceable nozzles is combined with the spraying installation described at the outset.

Moreover, the air passage on the substantially vertical arms of the U-shaped frame preferably decreases in cross-section in downward direction. Due to this decrease in cross-section the air is forced out of the passage with approximately the same force at all places along the passage.

This construction enables the underside of the vehicle to be washed at the same time as the upper part. Consequently the time required for the complete washing is decreased considerably.

Figure 2:
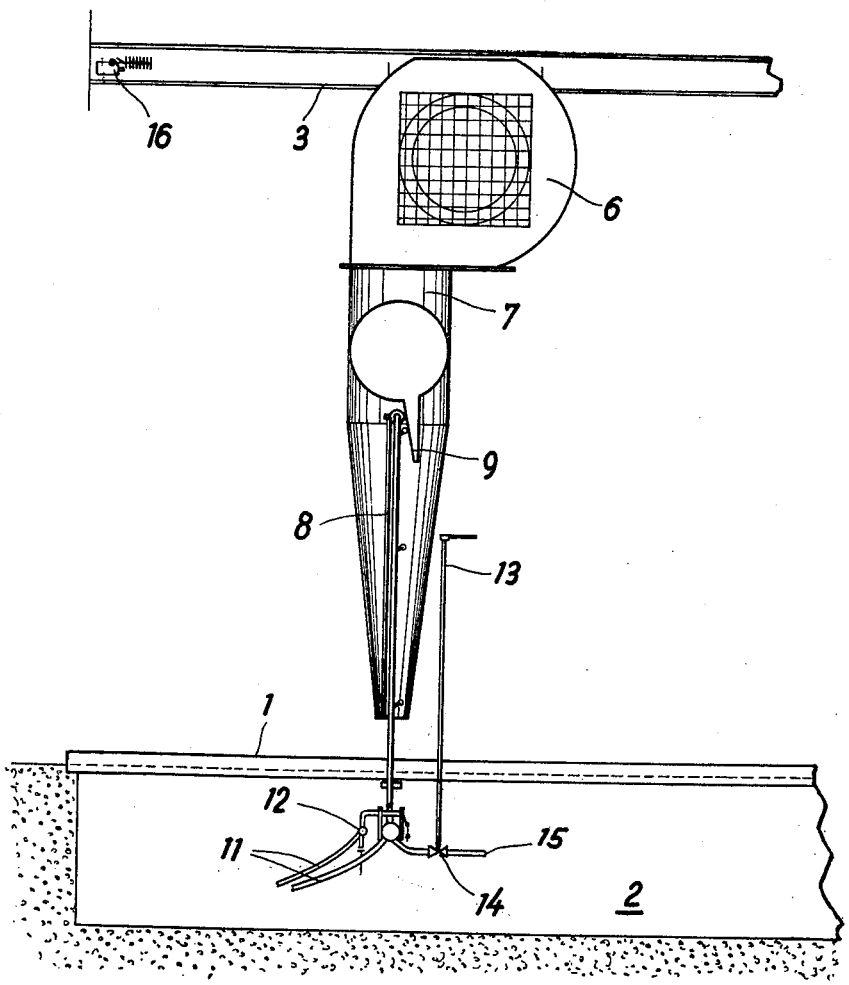

An embodiment of the invention is illustrated by way of example in the accompanying drawings, in which
FIG. 1 shows the washing and drying plant in front elevation, and
FIG. 2 is a side elevation view in the direction of the arrows II—II in FIG. 1.

In a washing cabin, run-in rails 1 are provided above a pit 2 for the vehicle to be washed. On the roof of the cabin a rail 3 is fitted in the longitudinal direction and along this rail rollers 4 are driven at the required speed by an electric motor through the intermediary of V-belts, not shown in the drawings. The motor 5 also drives a blower 6, capable of being switched on and off, which blower forces the sucked in air into an air passage 7 which is constructed in the form of an inverted U-shaped frame so that it surrounds a vehicle run onto the rails 1 at the top and on both sides. A water spraying installation 8 is jointly movable with this air passage and forms a unit therewith, the pipes of the installation being bent at right angles in U-shape in such a manner that they extend across the top and down the sides of the vehicle run into the cabin. The water spraying installation is provided with nozzles which can spray the roof and side walls of the vehicle. This spraying installation 8 is connected to a conduit 18 extending under the rails 1 and provided with upwardly directed nozzles which are preferably movable in lateral direction. This spraying installation 8, 18 is connected with the air passage 7 and forms therewith a unit which is supported against the inner wall of the pit 2 by loosely rotatable rollers 10. The water feed to the spraying installation consists of a conduit 11 connected to the pipe 18 through the intermediary of a pressure valve 12. A valve 14 operated by means of a handle 13 is also provided in the discharge conduit 15. At the beginning and at the end of the rails 3, end stops 16 are fitted which may be constructed as switches and serve for the electric control of the admission valve 12 as well as for switching the driving motor on and off.

A vehicle run on to the rails 1 thus enters the inverted U-shaped washing installation. When the water feed has been turned on, the vehicle is sprayed from above, at the sides and underneath. At the same time the motor drives the rollers 4 thereby moving the spraying installation at a uniform speed from one end of the cabin, along the entire length of the vehicle to the other end of the cabin. On encountering the end stop 16 fitted at the end of the rail 3, the electric motor is either switched off or reversed. In the latter case the washing apparatus runs back to the run-out end of the rails. After the vehicle has been sprayed with water it can be given a foam bath with the same spraying installation. The foam is fed to the spraying installation 8, 18 from a container, not shown in the drawing, through the same feed conduit 11 and sprayed on to the vehicle by nozzles in the pipe sections of the apparatus. The foam bath can be followed by another washing with water.

When the washing is finished and the discharge valve 14 has been opened by actuating the hand lever 13 so that the water in the spraying installation 8 drains off through the conduit 15, the blower 6 is coupled with the electric motor and the air drawn in by the blower forced into the air passage 7. This air under pressure in the passage 7 is forced out at the top through the nozzles 9 in the transverse section of the passage and at the sides through discharge nozzles provided in the vertical sections forming the lateral arms of the inverted U-shaped passage which decrease in cross-section in downward direction. The current of air passing out from the nozzles blows against the wet vehicle thereby removing the drops of water thereon and in this manner dries the roof and side walls of the vehicle. Simultaneously with the switching on of the blower the drive of the rollers is also engaged, so that the apparatus runs slowly in the opposite direction until it encounters the top end stop 16 which then switches off or reverses the motor so that the apparatus runs back into its initial position.

In the first working stage the dirt is washed off the whole of the vehicle including the underside thereof and the wings or mudguards with the housing of the gear axles and wheels. In the second working stage the drops of water adhering to the vehicle are blown off by the air currents, thereby drying the outer side of the vehicle.

I claim:
1. A motor vehicle washing apparatus comprising run- on rails for the vehicle to be washed arranged over a pit, an inverted U-shaped frame composed of pipes extending transversely over the top and down the sides of the vehicle on said run-on rails, an overhead rail extending in the longitudinal direction over the top of the vehicle, rollers supporting said frame on said overhead rail, an electric motor driving said rollers to move said frame from one end to the other of said overhead rail, stops arranged one at each end of said overhead rail limiting the travel of said rollers on said overhead rail and constructed as switches controlling said motor, a unit composed of a water spraying installation and a blower with air passage extending therefrom to inwardly directed blowing apertures in said inverted U-shaped frame, and a conduit connected to said spraying installation extending transversely under said run-on rails and provided with upwardly directed, laterally displaceable nozzles for washing the underside of the vehicle.

2. A motor vehicle washing apparatus comprising run-on rails for the vehicle to be washed arranged over a pit, an inverted U-shaped frame composed of pipes extending transversely over the top and vertically downwards along the sides of the vehicle on said run-on rails, an overhead rail extending in the longitudinal direction over the top of the vehicle, rollers supporting said frame on said overhead rail, an electric motor driving said rollers to move said frame from one end to the other of said overhead rail, stops arranged one at each end of said overhead rail limiting the travel of said rollers on said overhead rail and constructed as switches controlling said motor, a unit composed of a water spraying installation and a blower with air passage extending therefrom to inwardly directed blowing apertures in said inverted U-shaped frame, the two vertical sections of which gradually decrease in cross-section in downward direction, and a conduit connected to said spraying installation extending transversely under said run-on rails and provided with upwardly directed, laterally displaceable nozzles for washing the underside of the vehicle.

References Cited in the file of this patent
UNITED STATES PATENTS

| | | |
|---|---|---|
| 2,676,600 | Vani | Apr. 27, 1954 |
| 2,703,579 | Merancy | Mar. 8, 1955 |
| 2,896,644 | Emanuel | July 28, 1959 |
| 2,931,061 | Holtzclaw | Apr. 5, 1960 |
| 2,977,181 | Reiterer | Mar. 28, 1961 |

FOREIGN PATENTS

| | | |
|---|---|---|
| 509,564 | Great Britain | July 18, 1939 |